US011800354B2

(12) United States Patent
Avetoom

(10) Patent No.: US 11,800,354 B2
(45) Date of Patent: Oct. 24, 2023

(54) SYSTEMS AND METHODS FOR IMPROVED ACCESS TO CUSTOMER REGISTRATION INFORMATION

(71) Applicant: T-Mobile USA, Inc., Bellevue, WA (US)

(72) Inventor: Paul Avetoom, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 534 days.

(21) Appl. No.: 16/846,029

(22) Filed: Apr. 10, 2020

(65) Prior Publication Data

US 2021/0321254 A1    Oct. 14, 2021

(51) Int. Cl.
| | |
|---|---|
| *H04W 12/06* | (2021.01) |
| *G06F 9/54* | (2006.01) |
| *G06F 16/9535* | (2019.01) |
| *H04W 8/02* | (2009.01) |
| *G06F 21/62* | (2013.01) |
| *H04W 92/24* | (2009.01) |
| *G06Q 30/016* | (2023.01) |

(52) U.S. Cl.
CPC .............. *H04W 12/06* (2013.01); *G06F 9/54* (2013.01); *G06F 16/9535* (2019.01); *G06F 21/6245* (2013.01); *H04W 8/02* (2013.01); *G06Q 30/016* (2013.01); *H04W 92/24* (2013.01)

(58) Field of Classification Search
CPC ....... H04W 12/06; H04W 8/02; H04W 92/24; H04W 8/18; G06F 9/54; G06F 16/9535; G06F 21/62; G06Q 30/00
See application file for complete search history.

(56) References Cited

U.S. PATENT DOCUMENTS

| | | | | |
|---|---|---|---|---|
| 11,109,307 | B2* | 8/2021 | Bartolome | H04L 67/16 |
| 2004/0255034 | A1* | 12/2004 | Choi | H04L 29/12594 |
| | | | | 709/229 |
| 2009/0328186 | A1* | 12/2009 | Pollutro | G06F 21/335 |
| 2013/0081128 | A1* | 3/2013 | Gupta | G06F 9/505 |
| 2020/0228613 | A1* | 7/2020 | Han | H04L 67/16 |

OTHER PUBLICATIONS

A. Bhat, V. Gojanurand R. Hegde, "4G protocol and architecture for BYOD over Cloud Computing," 2015 International Conference on Communications and Signal Processing (ICCSP), 2015, pp. 0308-0313, doi: 10.1109/ICCSP.2015.7322894. (Year: 2015).*
3GPP TS 29.518 version 15.4.0 Release 15, dated Jul. 2019, "3GPP_AMF_Standard." (Year: 2019).*

* cited by examiner

*Primary Examiner* — Charles C Jiang
*Assistant Examiner* — Shawn D Miller
(74) *Attorney, Agent, or Firm* — Loeb & Loeb LLP

(57) ABSTRACT

A computer-implemented method for providing customer registration information for a customer in a cellular network. The method comprises receiving a request for customer registration information from a requesting entity. The method includes providing login credentials associated with the requesting entity to a control node, and querying the control node for customer registration information. The method includes receiving customer registration information in response to the query and parsing the received customer registration information. The method includes converting the received customer registration information to an API response and transmitting the converted customer registration information to the requesting entity.

19 Claims, 6 Drawing Sheets

SYSTEMS AND METHODS FOR IMPROVED ACCESS TO CUSTOMER REGISTRATION INFORMATION

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Agents or applications related to a network provider, such as a cellular communications or data provider, may periodically seek access to data for particular or groups of telecom customers. For example, certain customer service scenarios may be addressed at least partially by an agent accessing registration information for a customer, such as connectivity data, plan data, etc. Traditionally, however, accessing particular types of data may be technically burdensome, time consuming, and/or computationally inefficient.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a computer-implemented method for providing customer registration information for a customer in a cellular network. The method may comprise receiving a request for customer registration information from a computing device of a requesting entity. The request for customer registration information may include a customer identifier of the customer. The method may include providing login credentials associated with the requesting entity to a control node, and querying the control node for customer registration information based on the customer identifier. The method may include receiving customer registration information in response to the query, and parsing the received customer registration information. The method may include converting the received customer registration information to an application programming interface (API) response, and transmitting the converted customer registration information to the computing device of the requesting entity.

In another embodiment, the disclosure describes a system for providing access to customer registration information for a customer in a cellular network. The system may comprise a computing device associated with a requesting entity, a control node of the cellular network, and a client system. The client system may include an application programming interface (API) configured to receive a request for customer registration information from the computing device of the requesting entity. The request for customer registration information may include a customer identifier of the customer. The API may be configured to query the control node for customer registration information based on the customer identifier. The API may be configured to receive customer registration information in response to the query and parse the received customer registration information. The API may be configured to convert the received customer registration information to a REST API response, and transmit the REST API response to the computing device of the requesting entity.

In another embodiment, the disclosure describes a computer-implemented method for providing customer registration information for a customer in a cellular network. The method may comprise receiving a representational state transfer (REST) application programming interface (API) request from a computing device of a requesting entity. The REST API request may include a customer identifier of the customer. In response to receiving the REST API request, the method may include providing login credentials associated with the requesting entity to an access and mobility management function (AMF), wherein the AMF is configured to authenticate the login credentials with a network repository function (NRF). In response to authenticating the login credentials, the method may include querying the AMF for customer registration information based on the customer identifier. The method may include receiving customer registration information in response to the query and parsing the received customer registration information. The method may include converting the received customer registration information to a REST API response and transmitting the REST API response to the computing device of the requesting entity.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1:
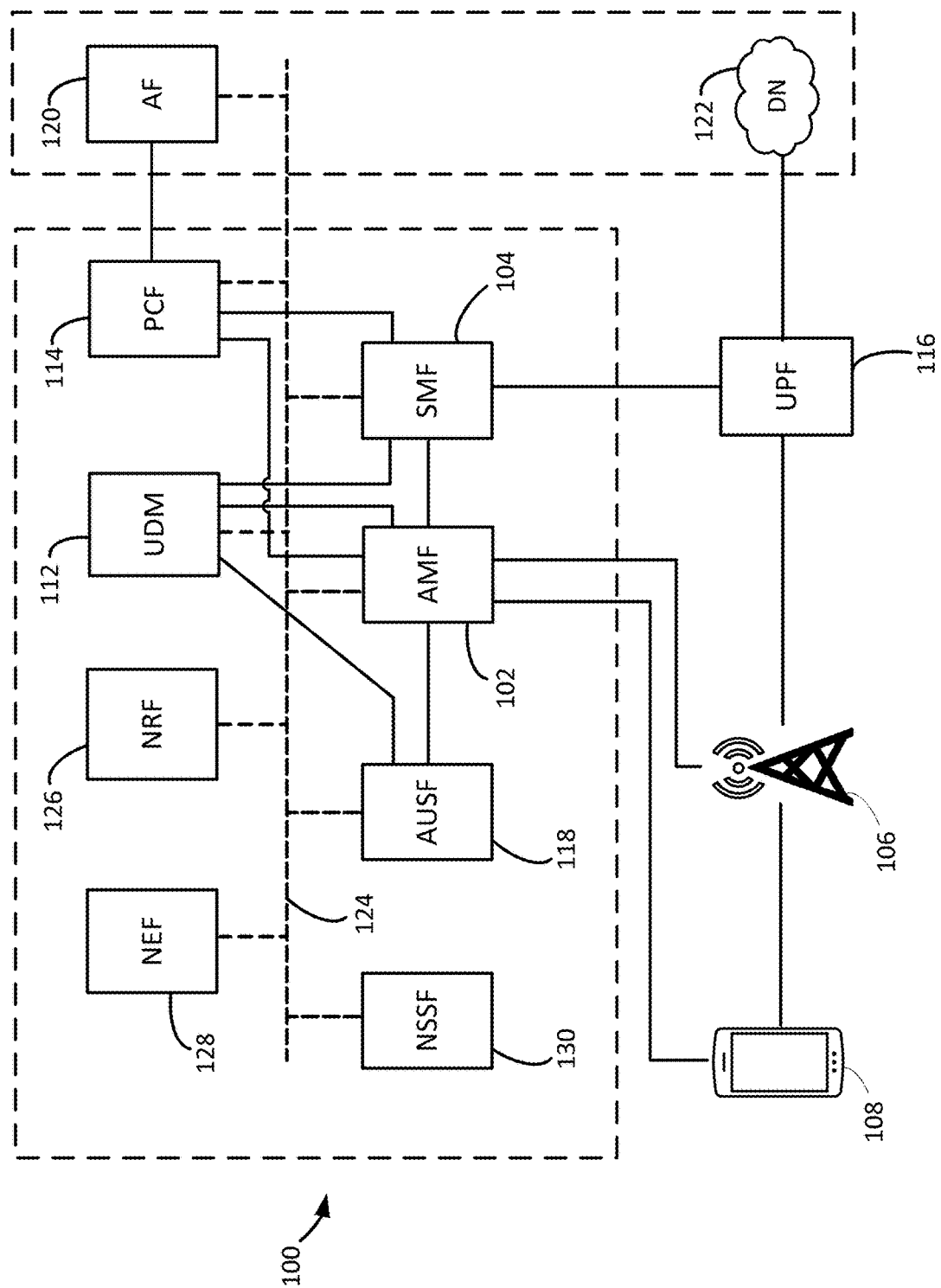
FIG. 1 is a high level diagram of an embodiment of a network environment for a system and methods for improved access to customer registration information in accordance with the disclosure.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Network operators or providers, such as entities providing cellular phone and data service, may use various hardware, software, or other tools and systems to review and manage network data and customer service. In some embodiments, network operators may provide systems and methods to access customer registration information so that agents or applications of the network operator may access information, for example, while troubleshooting, assessing service quality, etc. In some embodiments, access to customer registration information may only be achieved by subscribing for updates to a particular customer's registration information, waiting for updates to that information to be received from a database, system, or other source, then unsubscribing from the same updates to stop receiving that information. In some embodiments, traditionally, an entity seeking such customer registration information may not simply obtain the current data for that customer without going through the subscription process described above.

For example, in 5G systems, a client system (e.g., network operator, troubleshooting, customer service entity, etc.) may need to retrieve customer registration information from a control node for the 5G network, such as an access and mobility management function (AMF). In some embodiments, the AMF may be accessed via an AMF Representational State Transfer (REST) interface. In some embodiments, the AMF specification related to the AMF REST interface may be 3GPP TS 29 518 Release 16, but other specifications may be developed and implemented periodically that may work in a similar or equivalent manner. Traditionally, under the AMF specification, a client system may subscribe to updates to customer registration information on the AMF, but may not be able to obtain the current data directly without subscribing, receiving updates, and unsubscribing to that customer's updates. Similar restrictions may apply to accessing data of customers in the LTE network domain, using a mobility management entity (MME) as a control node. The result may be slow, inefficient, and computer resources intensive access to customer registration information, which may slow response to network problems, increase computing resources required to access the information, and generally reduce network efficiency, quality of service, and customer service efficiency.

The disclosure describes a system and methods for improved access to customer registration information that may provide increased efficiency, fewer computer resources, and faster customer service troubleshooting, among other benefits and technical improvements. In some embodiments, a client system may obtain current data for a particular customer registration using manual steps via the AMF REST interface for an AMF. In some embodiments, the client system may be programmed to perform similar steps automatically based on inputs from a requesting entity. In some embodiments, the disclosure describes an application programming interface (API) that may receive input from a requesting entity, may interface with the AMF REST interface for an AMF, and may return customer registration information for a particular customer. In some embodiments, the system may allow any application or entity registered with a network repository function (NRF) (e.g., as an application function (AF)) to provide subscription, location, detailed registration information, etc., over the AMF REST interface. In some embodiments, the system may provide access to this information without registering or subscribing for notification updates.

In some embodiments, the system may provide access to customer registration information in one of a variety of ways via the AMF REST interface or other suitable interface. For example, in some embodiments, an application or entity may send an HTTP POST request to the client system or AMF to initiate retrieval of customer registration information. In some embodiments, the POST request may have a zero duration notification. In some embodiments, an application or entity may send a HTTP GET request to the client system or AMF via the AMF REST interface or other suitable means. In some embodiments, an application or other entity may request customer registration information by sending a GET, POST, or other type of request to an API programed to retrieve the requested customer registration information from the AMF. In some embodiments, an application or other entity may use an API to request a particular customer's registration data, and a customer registration API may include HTTP POST and/or HTTP GET requests. In such embodiments, the API may interface with the REST API and the AMF, and may include a user interface or graphical user interface (GUI) that may receive identifying customer information (e.g., international mobile subscriber information (IMSI), mobile station integrated services digital network (MSISDN), etc.) for the desired customer. The system and method described herein may allow identification of subscriber registration in a 5G, LTE, or other network substantially close to the edge of the core network as possible. In some embodiments, the system and methods may also allow for the identification of the serving cell, current cell identification (CID), last CID, etc., that may be used in fault identification and triangulation, among other things.

FIG. 1 shows an embodiment of an example of a networking and computing architecture 100 in which the system and methods for improved access to customer registration information may exist. The architecture 100 may include an AMF 102 that may connected to a session management function (SMF) 104, a base station (e.g., g node B (gNB)) 106, user equipment (UE) 108, authentication server function (AUSF) 110, unified data management (UDM) 112, and policy control function (PCF) 114. The AMF 102 may be connected to and/or communicate with each part of the architecture via various interfaces and protocols, such as N1, N2, N12, N15, N8, etc. The SMF 104 may be connected to or interface with the AMF 102, the UDM 112, the PCF 114, and the user plane function (UPF) 116. The SMF 104 may connect or interface with the other nodes via one or more interfaces or protocols, such as N11, N10, N7, N4, etc. The gNB 106 may connect or interface with the AMF 102, the UE 108, and the UPF 116 via one or more protocols or interfaces such as N6, N2, N3, etc. The AUSF 118 may connect to or interface with the AMF 102 and the UDM 112 via protocols or interfaces such as N12, N13, etc. The PCF 114 may be connected to or interface with AMF 102, the SMF 104, and an application function (AF) 120 via protocols or interfaces such as N7, N8, N5, etc. The UPF 116 may be connected to or interface with the SMF 104, the gNB 106, and a data network (DN) 122 via protocols or interfaces such as N3, N4, N6, etc. The AMF 102 and other system elements may also communicate with or otherwise interface various other nodes via a message bus such as a serial bus interface (SBI) message bus 124. For example, the AMF 102 and other elements may communicate with a network repository function (NRF) 126, a network exposure function (NEF) 128, and a network slice selection function (NSSF) 130, and the AF 120.

In some embodiments, such as in some 5G networks, the SMF 104 may be a fundamental element of the service-based architecture (SBA). In some embodiments, the SMF 104 may be responsible for interacting with the decoupled data plane, creating updating and removing Protocol Data Unit (PDU) sessions and managing session context with the UPF 116. Both the UE 108 and the gNB 106 may use next generation application protocol (NGAP) to carry non-access stratum (NAS) messages across N1 or N2 reference interfaces in order to request a new session. The AMF 102 may receive these requests and may handle connection or mobility management while forwarding session management requirements over the interface (e.g., N11) to the SMF 104. The AMF 102 may determine which SMF 104 may be best suited to handle the connection request by querying the NRF 126. The interface between the NRF 126 and the AMF 102 and the interface (e.g., N11) between the AMF and the specific SMF 104 assigned by the NRF may use the SBI message bus 124, to which most or all of the system elements may be connected. In some embodiments, the SBI message bus 124 may employ RESTful API principles over HTTP/2.

In some embodiments, the NRF 126 may maintain a repository of the 5G elements available in the operator's network along with services provided by each of the elements in the 5G core that are expected to be instantiated, scaled, and terminated with minimal manual intervention, if any. The NRF 126 may also support discovery mechanisms that may allow network elements to discover each other and get updated status of the desired elements. The NRF 126 may maintain the profiles of the available network function (NF) instances and supported services in the core network. The NRF 126 may also allow consumer NF instances to discover other providers NF instances in the core network (e.g., 5G core network). The NRF 126 may also allow NF instances to track the status of other NF instances. In some embodiments, the NRF 126 may interact with substantially every other element in the 5G core network and may support the above functions through management services and discovery services.

Figure 2:
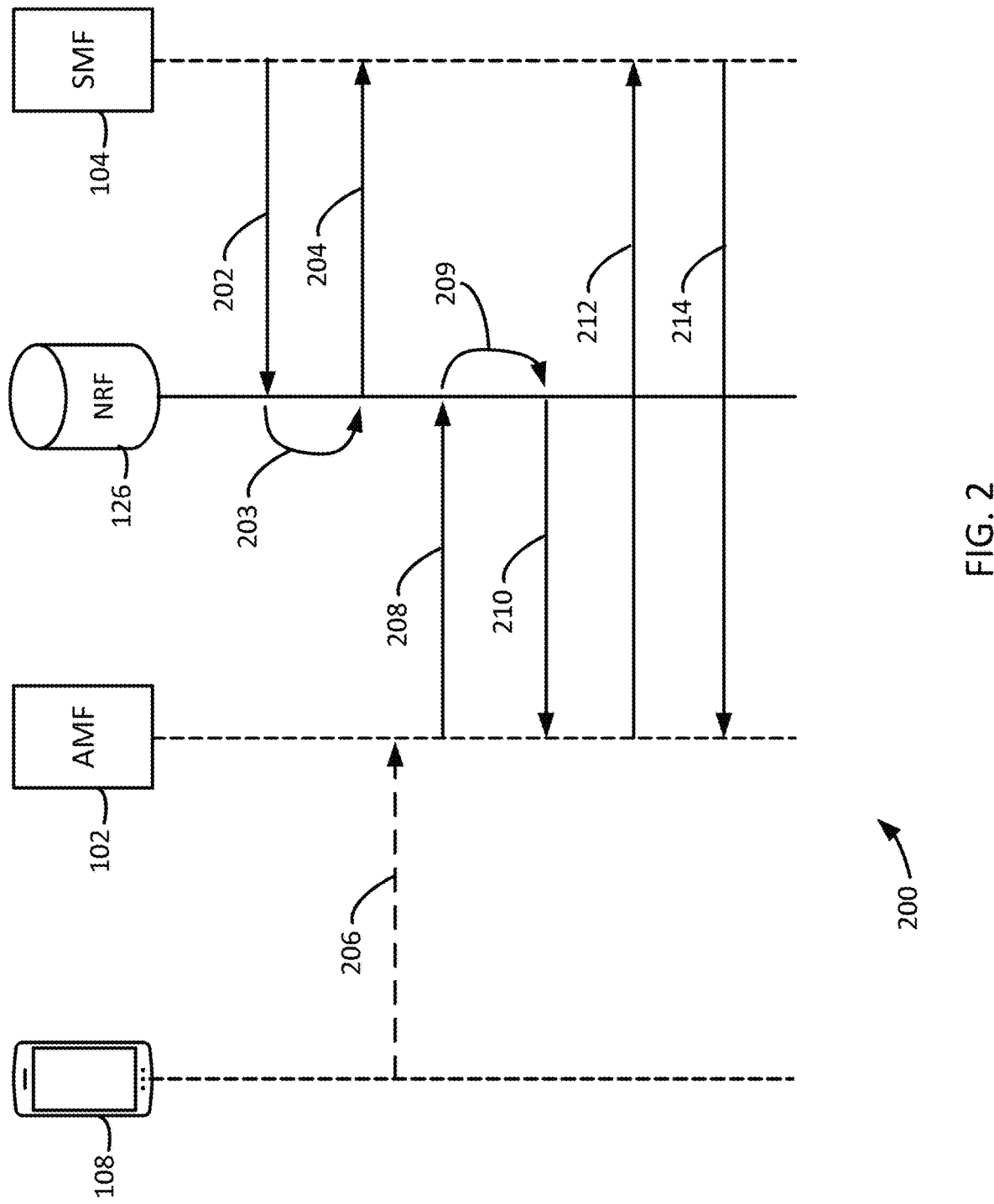
FIG. 2 is a data flow diagram of components of an embodiment of the system for improved access to customer registration information.

FIG. 2 shows an embodiment of data flow diagram 200 for example data traffic between the AMF 102, the UE 108, the NRF 126, and the SMF 104. Those skilled in the art will understand that the data flow shown in FIG. 2 is merely an example and that other data flows consistent with the scope of the disclosure may be used as well. At 202, the SMF 104 may send an HTTP PUT request to the NRF 126 for service registration 203. In response, at 204, the NRF 126 may send a success response to the SMF 104, (e.g., HTTP 201 Created). At 206, the UE 108 may send a session establishment request to the AMF 102. In response, at 208, the AMF 102 may send an HTTP POST request to the NRF 126 for service discovery 209. At 210, in response, the NRF 126 may send a success response (e.g., HTTP 200 OK) that may include a list of SMFs to the AMF 102. The AMF 102 may then establish a session with an SMF 104 by, at 212, sending a create PDU session message (e.g., HTTP POST). The SMF 104 may, at 214, respond with a success message (e.g., HTTP 201 Created), establishing the requested session.

Figure 3:
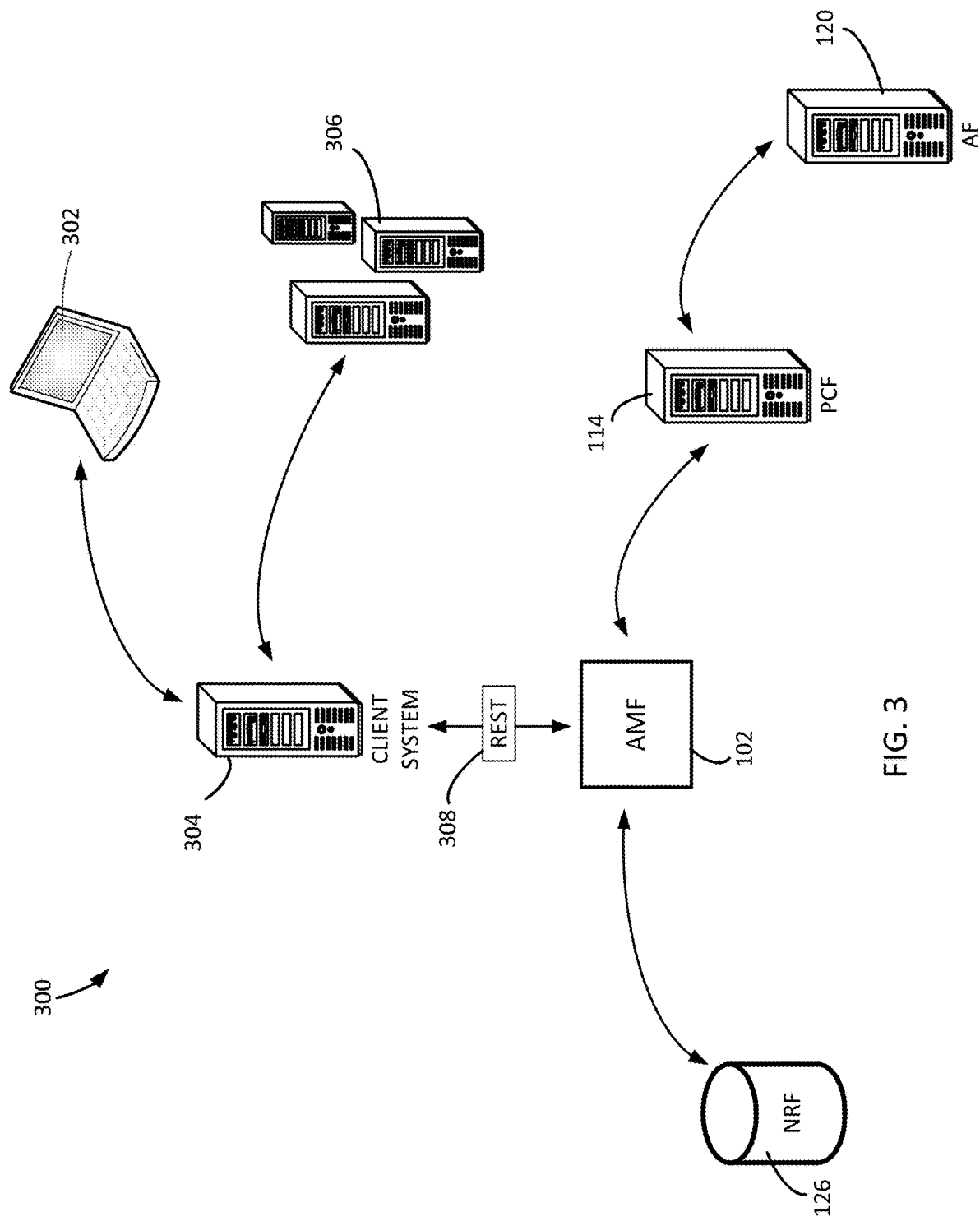
FIG. 3 is a high level diagram of an embodiment of a computing environment for the system for improved access to customer registration information of FIG. 1.

FIG. 3 shows an embodiment of a computer environment 300 in which embodiments of the disclosed system for improved access to customer registration information may operate. In some embodiments, the computing environment 300 may include at least one client system 304 that may be connected to or capable of connecting to one or more requesting entity computing devices 302 and/or one or more requesting entity servers 306. In some embodiments, the client system 304 may be a server-type computing device specially configured to operate the system for improved access to customer registration information and/or a customer registration API configured to receive requests and return customer registration information as disclosed herein. The requesting entity computing device 302 may be any type of suitable computing device capable of interfacing with the client system 304 via a data network such as the Internet, a local area network, a direct or wireless connection, using any suitable interface known to those skilled in the art, such as HTTP, simple object access protocol (SOAP), REST, etc. The requesting entity servers 306 may be any of a variety of servers hosting applications or other entities that may request customer registration information from the client system 304. In some embodiments, the customer registration API may run on the requesting entity computer device 302 and/or the requesting entity server 306 and provide for sending requests to the client system 304 or AMF 102. The client system 304 may interface with one or more AMFs, such as AMF 102 described in reference to FIGS. 1 and 2. In some embodiments, the client system 304 may interface with the AMF 102 via a REST interface and, more specifically, an AMF REST interface. The AMF 102 may be a traffic node in the system that may record any changes to customer profile information. Any time a customer or network provider makes changes to the customer profile, the changes may be updated on the AMF 102. In some embodiments, the customer registration information may include substantially all information for a particular customer registered on a particular node. The AMF 102 may connect or otherwise interface with the NRF 126, the PCF 114, and the AF 120. Further details on example embodiments of these connections and associated interfaces are described in reference to FIGS. 1 and 2 above.

Figure 4:
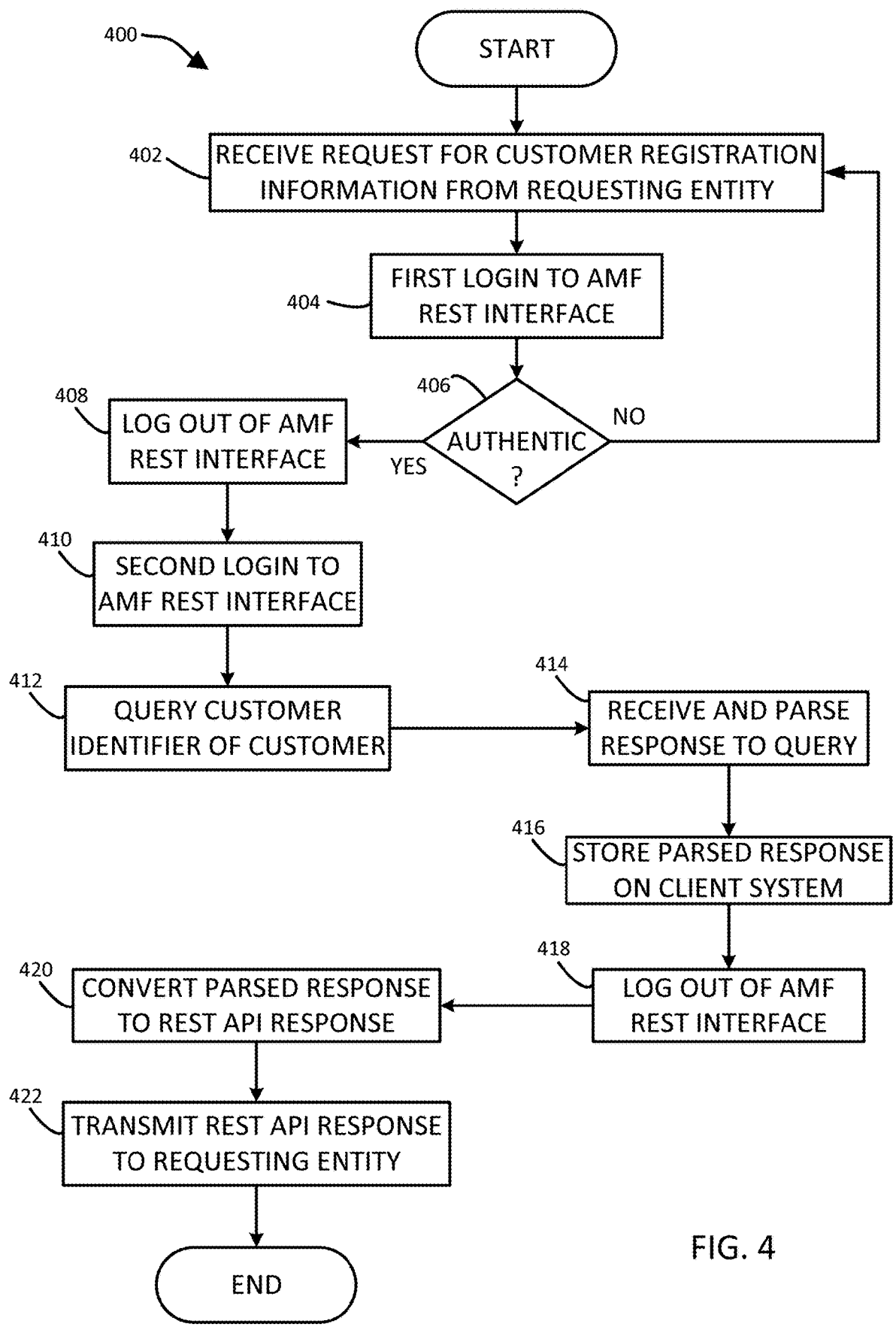
FIG. 4 is a flowchart of an embodiment of a method of improved access to customer registration information in accordance with the disclosure.

In some embodiments, a client system may obtain current data for a particular customer registration via the AMF REST interface for an AMF. The flow chart 400 in FIG. 4 illustrates an embodiment of a method to retrieve customer registration information in accordance with the system and methods for accessing customer registration information. In some embodiments, the customer registration information may be retrieved via the customer registration API. At 402, the method may include receiving, at a client system such as client system 304, a request for customer registration information from a requesting entity. In some embodiments, the request may come from a requesting entity computing device 302 or requesting entity server 306, such as those shown and described with reference to FIG. 3. In some embodiments, the request for customer registration information may be in a REST API request format. In some embodiments, the request for customer registration information may be a HTTP POST request, or an HTTP POST request with a zero duration notification. In some embodiments, the request for customer registration information may be an HTTP GET request. At 404, in response to receiving the request, the client system may execute a first login to the AMF via the AMF REST interface. At 406, the AMF, such as AMF 102 in FIG. 3, may authenticate the first login from the client system. In some embodiments, the authentication process may include checking that the requesting entity is registered with an NRF, such as NRF 126 in FIG. 3. In some embodiments, the authentication process may include determining whether the requesting entity may be registered with an NRF as an application function (AF), such as AF 120 in FIG. 3. If the first login cannot be authenticated, the request may be denied. If the first login may be authenticated, the client system may logout of the AMF REST interface at 408 and may execute a second login to the AMF REST interface at 410. Once logged in for the second time, the client system may submit query on a customer identifier of a particular customer with the AMF. In some embodiments, the query may be made using man-machine language (MML). In some embodiments, the customer identifier may be an IMSI, MSISDN, or other identification unique to the particular customer or customer account. Once the AMF runs the query, the client system may, at 414, receive a query response and parse the response to the query. At 416, the client system may store the query response and/or parsed query response on the client system. At 418, the client system may log out of the AMF REST interface again, and at 420, the client system may convert the stored query response to a REST API response. At 422, the client system may send the REST API response to the requesting entity. In some embodiments, the REST API response may be in a format so as to provide the requested customer registration information to the requesting entity.

```
[cmm@cmm1-be3vamf1-necc0 ~]$ cmm subscriber show --imsi 310310140000130
```

| Field | Value |
|---|---|
| GENERALINFO: | |
| | amfCmState: IDLE |
| | amfRmState: DEREGISTERED |
| | cppsId: 0 |
| | cppsRestartCount: 0 |
| | dbsPoolId: 0 |
| | hssIdentity: |
| | imei: 10310140011130 |
| | imsi: 310310140000130 |
| | sisdn: 12001400130 |
| | radioAccessType: NR |
| | softwareVersion: 00 |
| | suci: |
| | imsiMsin: 140000130 |
| | plmn: 310310 |
| | protectionSchemeId: 0 |
| | routingIndicator: 0 |
| | tmsi5g: 0xC000012D |
| | ueNgapId: 4294967295 |
| BASEDATA: | |
| | cliMoveInprog: 0 | eletingEntryForCli: 0 dumpCxnStateTrans: 0 lastAmfUeActivityTimestamp: 3766850143305 localCpMoveInprog: 0 remoteCpMoveInprog: 0 ueCxnIdx: 0 ueCxnMsgQCnt: 0 ueCxnQid: 4 vlrIdx: 5

COMMONDATA:

callTraceIdx: 1 callTraceInformation:

traceDeletingFlag: false traceFailureIndication: false traceHasInfoBeenSentToENB: false traceInfo:

listOfNeTypes:

bm_sc: false enb: false ggsn: false mgw: false mme: false msc_s: false pdn_gw: false rnc: false sgsn: false sgw: false plmn: 000000 present: 0 sessionTraceDepth: 0 traceSgwNotified: false deletingEntry: false imeiStatus: no IMEI status msisdnCallTraceIdx: 240

AMFSUBNSSAI:

defaultSnssaiCount: 1 defaultSnssaiList:

- sst: 1, (isSdPresent: true, sd: 0x00ABCDEF)

snssaiCount: 0 supportedFeatures:

bitmask: 0x00000000

AMFSUBSCRIPTIONDATA:

amSupportedFeatures:

bitmask: 0x00000000 coreNetwRestrictCount: 1 coreNetwTypeRestrictions:

- EPC forbiddenAreasCount: 0 imsiGrpIdCount: 0 msisdnNaiNpi: -111 nonUdmDataFlag: false ratFreqSelectPriorityId: 0 ratRestrictCount: 2 ratRestrictions:

- EUTRA

- WLAN serviceAreaRestriction:

maxNumberOfTAs: 0 restrictAreaCount: 0 restrictionType: INVALID smfSelCount: 1 smfSelList: 0 smfSelPoolIdxList: 5 smfSelSupportedFeatures:

bitmask: 0x00000000 smsSubscribedFlag: false smsfInfo:

plmn: 000000 smsfUuid: 0x00000000000000000000000000000000 subscriberRegTimer: 3200 ueAmbr:

maxReqBandwidthDl: 100000000 maxReqBandwidthUl: 110000000 ueHomePlmn: 310310

AMFSUBSMFSEL:

- dnnCount: 1 dnnInfo:

| - defaultDnnIndFlag: true dnn: uncarrier.5g dnnFpx: 0 iwkEpsIndFlag: false smfIdx: 0 smfPoolIdx: 0 snssai:

sst: 1, (isSdPresent: true, sd: 0x00ABCDEF)

AMFSXN:

allowedSnssaiCount: 1 allowedSnssaiList:

- sst: 1, (isSdPresent: true, sd: 0x00ABCDEF)

amf5gmmUeCapability: 0x07 amfInitialRegistrationAuth: 0 amfInitialRegistrationGutiReallocCount: 0 amfMobilityRegistrationGutiReallocCount: 0 amfMobilityRegistrationUpdateAuth: 0 amfNetworkFeatureSupport: 0x0000 amfPcmdRecordSequenceCount: 12 amfPcmdServiceInitiationCount: 0 amfPeriodicRegistrationUpdateAuth: 0 amfRatType: NR amfS1UeNetworkCapability: NONE (0)

amfServiceReqGutiReallocCount: 0 amfServiceRequestAuth: 0 amfUeInitDeregistrationAuth: 3 amfUeNgapId: 4294967295 amfUeUsageSetting: invalid amfUsedRatFreqSelectPriorityId: 0 cmConnectedState: INVALID currentAccessType: 3GPP currentAmfNrCgi:

cellId: 0x00030F08 plmn: 310310 currentAmfTai:

plmn: 310310 tac: 0x000022B8 forbiddenAreasChgFlag: false foreignGuti5g:

guami:

amfPointer: 0 amfRegionId: 0 amfSetId: 0 aplmnId: FFFFF tmsi5g: 0xFFFFFFFF globalGnbId:

extGnbId: 0x00000001 extGnbIdLen: 32 fill: 0x00000000 gnbIdType: MACRO plmn: 310310 gnbIdx: 1 gnbIdxPrevious: 0 gnbRestartCount: 136 guti5g:

guami:

amfPointer: 10 amfRegionId: 1 amfSetId: 1 aplmnId: 310310 tmsi5g: 0xC000012D hpcfUuid: 0x00000000000000000000000000000000 imsVoPS: homogeneous invalid imsVoiceSupportMatchIndicator: invalid lastConnGuti5gTimestamp: 0 lastNotifyId: 1 lastRegAmfTaiList:

count: 0 lastSeenAmfNrCgi:

cellId: 0x00030F08 plmn: 310310 lastSeenAmfTai:

plmn: 310310 tac: 0x000022B8 lastSeenAmfTaiTimestamp: 3766850060869 lastSeenGnbHistList: []

lastSeenGnbIdx: 1 lastSentAmfUeConfigUpdTimeZone: -118 lastSentPeriodicRegTimer: 720 networkRoutingIndicator: 0 nrfUuidForAusfSelection: 0x00000000000000000000000000000000 oldGuti5g:

guami:

amfPointer: 0 amfRegionId: 0 amfSetId: 0 aplmnId: FFFFF tmsi5g: 0xFFFFFFFF oldLastSeenAmfTai:

plmn: 000000 tac: 0x00000000 oldLastSeenAmfTaiTimestamp: 0 olderLastSeenAmfTai:

plmn: 000000 tac: 0x00000000 olderLastSeenAmfTaiTimestamp: 0 pcfRatFreqSelectPriorityId: 0 pcfReselectedIndFlag: false pcfServiceAreaRestrict:

maxNumberOfTAs: 0 restrictAreaCount: 0 restrictionType: INVALID pcfServiceAreaRestrictChgFlag: false pcfUePolicyUuid: 0x00000000000000000000000000000000 pcfUuid: 0x00000000000000000000000000000000 pduSessCount: 0 ranUeNgapId: 0 ranUeNgapIdPrevious: 4294967295 ratRestrictionChgFlag: false reportedStopAmfPagingFlag: false serviceAreaRestrictionChgFlag: false smsOverNasFlag: false smsfDetails:

apiVersion: 0x000000 scheme: invalid smsfIpAddress:

ipAddressType: invalid smsfIpPort: 0 smsfUuid: 0x00000000000000000000000000000000 startOf2AmfTACycleTimestamp: 0 startOf3AmfTACycleTimestamp: 0 stopAmfPagingFlag: false subscriptionId:
0x2F6E75646D2D73646D2F76312F696D73692D3331303331303134303030303133302F73646D2D737562736372697074696F6E732F31 | ueAmfDrx:

drxValue: 0 present: 0 ueRadioCapLength: 12 usedAmfDrx:

drxValue: 0 present: 0 usedServiceAreaRestrict:

maxNumberOfTAs: 0 restrictAreaCount: 0 restrictionType: INVALID usedServiceAreaRestrictChgFlag: false usedServiceAreaRestrictSrc: invalid

AMFPDU:

- allocatedEbiCount: 0 allocatedPduSessCount: 0 dnnInUse: NONE dnnInUseFpx: 0 isEmerPduSessFlag: false notifyId: 0 pduSessPoolIdx: 0 pduSessionId: 0 psiListIdx: 0

AMFAUTHENTICATIONDATA:

authType: 5G aka curAuthIdx: 1 eapKseaf: 0x000000000000000000000000000000000000000000000000000000000000000000 plmn: 310310 reuseCurAuthIdxFlag: false vectorCount: 2 vectors:

- AUTN: 0xB0E2394D4563800098552D730A93BFB2

HXRES: 0xFC26B27DEA724BE169A60D8058430602

Kseaf:
0x354FBCCB3384553E6C720194D8D3DD43F02F9DB4159
09221930810444A905042

RAND: 0x3403000000000000EA56CF31F76285E0

- AUTN: 0x4C3377D516938000B97E06A3D89D8B27

HXRES: 0xB3D40AB96F3D4505BE12922E631194FD

Kseaf:
0x5E064C91DA5CDD6DCFA452FE36D25B2AA8DC78FA5
6C05BC2BAA155A4C383BBB0

RAND: 0xF40300000000000077F2E9D50C9285E0

AMFSECURITYDATA:

dlNasCount3gpp: 5 gnbSecurityContext:

ncc: 0 nhKey:
0x016BF5C6C9B8466EAA402645C64BEE713A3DAE4709
C3D5EFE011BAD07F994AC6 kamf: 0x358EB05FF67BDA4E64E13BC19187034091AA0BCF2DBA84E301C7E0B3176D472C kamfPrime: 0x0000000000000000000000000000000000000000000000000000000000000000 keNBNasCount: 0 kenc: 0x282AFC0B9A9FFD396AF763BA173AE65C kint: 0xC3D10AC9BA241482E6D629702487D18A nasKsi_KsiValue: 3 nasKsi_tsc: CACHED selectedAsAlgorithm: 0 selectedCipheringNasAlgorithm: 0 selectedIntegrityNasAlgorithm: 0 ueSecurityCapability: 0x80C0 ulNasCount3gpp: 3

Once the query response is parsed and converted to REST API format, the converted parsed response may be expressed as, for example:

```
{

"GENERALINFO": {

"amfCmState": "IDLE",

"amfRmState": "DEREGISTERED",

"cppsId": "0",

"cppsRestartCount": "0",

"dbsPoolId": "0",
```

```
"hssIdentity": {

"imei": "123456789",

"imsi": "123456789",

"msisdn": "123456789",

"radioAccessType": "NR",

"softwareVersion": "00",

"suci": {

"imsiMsin": "140000230",

"plmn": "310210",

"protectionSchemeId": "0",

"routingIndicator": "0"

},

"tmsi5g": "0xC000012D",

"ueNgapId": "123456789"

},

"BASEDATA": {

"cliMoveInprog": "0",

"deletingEntryForCli": "0",

"dumpCxnStateTrans": "0",

"lastAmfUeActivityTimestamp": "3766850143305",

"localCpMoveInprog": "0",

"remoteCpMoveInprog": "0",

"ueCxnIdx": "0",
```

```
"ueCxnMsgQCnt": "0",

"ueCxnQid": "4",

"vlrIdx": "5"

},

"COMMONDATA": {

"callTraceIdx": "1",

"callTraceInformation": {

"traceDeletingFlag": "false",

"traceFailureIndication": "false",

"traceHasInfoBeenSentToENB": "false"

},

"traceInfo": {

"listOfNeTypes": {

"bm_sc": "false",

"enb": "false",

"ggsn": "false",

"mgw": "false",

"mme": "false",

"msc_s": "false",

"pdn_gw": "false",

"rnc": "false",

"sgsn": "false",

"sgw": "false"
```

```
},
"plmn": "000000",
"present": "0",
"sessionTraceDepth": "0",
"traceSgwNotified": "false",
"deletingEntry": "false",
"imeiStatus": "no IMEI status",
"msisdnCallTraceIdx": "240"
}
},
"AMFSUBNSSAI": {
"defaultSnssaiCount": "1",
"defaultSnssaiList": [
{
"sst": 1,
"isSdPresent": "true",
"sd": "0x00ABCDEF"
}
],
"snssaiCount": "0",
"supportedFeatures": {
"bitmask": "0x00000000"
}
```

```
}
},
"AMFSUBSCRIPTIONDATA": {
"amSupportedFeatures": {
"bitmask": "0x00000000"
},
"coreNetwRestrictCount": "1",
"coreNetwTypeRestrictions": [
"EPC"
],
"forbiddenAreasCount": "0",
"imsiGrpIdCount": "0",
"msisdnNaiNpi": "-111",
"nonUdmDataFlag": "false",
"ratFreqSelectPriorityId": "0",
"ratRestrictCount": "2",
"ratRestrictions": [
"EUTRA",
"WLAN"
],
"serviceAreaRestriction": {
"maxNumberOfTAs": "0",
"restrictAreaCount": "0",
```

```
"restrictionType": "INVALID"

},

"smfSelCount": "1",

"smfSelList": "0",

"smfSelPoolIdxList": "5",

"smfSelSupportedFeatures": {

"bitmask": "0x00000000"

},

"smsSubscribedFlag": "false",

"smsfInfo": {

"plmn": "000000",

"smsfUuid": "0x00000000000000000000000000000000"

},

"subscriberRegTimer": "3200",

"ueAmbr": {

"maxReqBandwidthDl": "100000000",

"maxReqBandwidthUl": "110000000"

},

"ueHomePlmn": "310310"

},

"AMFSUBSMFSEL": {

"dnnCount": "1",

"dnnInfo": [
```

```
{
"defaultDnnIndFlag": "true",
"dnn": "uncarrier.5g",
"dnnFpx": "0",
"iwkEpsIndFlag": "false"
}
],
"smfIdx": "0",
"smfPoolIdx": "0",
"snssai": [
{
"sst": "1",
"isSdPresent": "true",
"sd": "0x00ABCDEF"
}
],
"AMFSXN": {
"allowedSnssaiCount": "1",
"allowedSnssaiList": [
{
"sst": "1",
"isSdPresent": "true",
"sd": "0x00ABCDEF"
```

}

],

"amf5gmmUeCapability": "0x07",

"amfInitialRegistrationAuth": "0",

"amfInitialRegistrationGutiReallocCount": "0",

"amfMobilityRegistrationGutiReallocCount": "0",

"amfMobilityRegistrationUpdateAuth": "0",

"amfNetworkFeatureSupport": "0x0000",

"amfPcmdRecordSequenceCount": "12",

"amfPcmdServiceInitiationCount": "0",

"amfPeriodicRegistrationUpdateAuth": "0",

"amfRatType": "NR",

"amfS1UeNetworkCapability": "NONE (0)",

"amfServiceReqGutiReallocCount": "0",

"amfServiceRequestAuth": "0",

"amfUeInitDeregistrationAuth": "3",

"amfUeNgapId": "4294967295",

"amfUeUsageSetting": "invalid",

"amfUsedRatFreqSelectPriorityId": "0",

"cmConnectedState": "INVALID",

"currentAccessType": "3GPP",

"currentAmfNrCgi": {

"cellId": "0xABCD8",

```
"plmn": "310310"

},

"currentAmfTai": {

"plmn": "310210",

"tac": "0xABCD"

},

"forbiddenAreasChgFlag": "false",

"foreignGuti5g": {

"guami": {

"amfPointer": "0",

"amfRegionId": "0",

"amfSetId": "0",

"aplmnId": "FFFFF",

"tmsi5g": "0xFFFFFFFF"

},

"globalGnbId": {

"extGnbId": "0x00000001",

"extGnbIdLen": "32",

"fill": "0x00000000",

"gnbIdType": "MACRO", plmn": "310210"

},

"gnbIdx": "1",
```

```
"gnbIdxPrevious": "0",

"gnbRestartCount": "136",

"guti5g": {

"guami": {

"amfPointer": "10",

"amfRegionId": "1",

"amfSetId": "1",

"aplmnId": "310210",

"tmsi5g": "0xC000012D"

}

},

"hpcfUuid": "0x00000000000000000000000000000000",

"imsVoPS": "homogeneous invalid",

"imsVoiceSupportMatchIndicator": "invalid",

"lastConnGuti5gTimestamp": "0",

"lastNotifyId": "1",

"lastRegAmfTaiList": {

"count": "0"

},

"lastSeenAmfNrCgi": {

"cellId": "0xABCD",

"plmn": "310210"

},
```

```
"lastSeenAmfTai": {

"plmn": "310210",

"tac": "0xABCD"

},

"lastSeenAmfTaiTimestamp": "3766850060869",

"lastSeenGnbHistList": [],

"lastSeenGnbIdx": "1",

"lastSentAmfUeConfigUpdTimeZone": "-118",

"lastSentPeriodicRegTimer": "720",

"networkRoutingIndicator": "0",

"nrfUuidForAusfSelection": "0x00000000000000000000000000000000",

"oldGuti5g": {

"guami": {

"amfPointer": "0",

"amfRegionId": "0",

"amfSetId": "0",

"aplmnId": "FFFFF"

},

"tmsi5g": "0xFFFFFFFF"

},

"oldLastSeenAmfTai": {

"plmn": "000000",

"tac": "0x00000000"
```

},

"oldLastSeenAmfTaiTimestamp": "0",

"olderLastSeenAmfTai": {

"plmn": "000000",

"tac": "0x00000000"

},

"olderLastSeenAmfTaiTimestamp": "0",

"pcfRatFreqSelectPriorityId": "0",

"pcfReselectedIndFlag": "false",

"pcfServiceAreaRestrict": {

"maxNumberOfTAs": "0",

"restrictAreaCount": "0",

"restrictionType": "INVALID"

},

"pcfServiceAreaRestrictChgFlag": "false",

"pcfUePolicyUuid": "0x00000000000000000000000000000000",

"pcfUuid": "0x00000000000000000000000000000000",

"pduSessCount": "0",

"ranUeNgapId": "0",

"ranUeNgapIdPrevious": "4294967295",

"ratRestrictionChgFlag": "false",

"reportedStopAmfPagingFlag": "false",

"serviceAreaRestrictionChgFlag": "false",

```
"smsOverNasFlag": "false",

"smsfDetails": {

"apiVersion": "0x000000",

"scheme": "invalid",

"smsfIpAddress": {

"ipAddressType": "invalid",

"smsfIpPort": "0",

"smsfUuid": "0x00000000000000000000000000000000"

}

},

"startOf2AmfTACycleTimestamp": "0",

"startOf3AmfTACycleTimestamp": "0",

"stopAmfPagingFlag": "false",

"subscriptionId": "0xABCD",

"ueAmfDrx": {

"drxValue": "0",

"present": "0"

},

"ueRadioCapLength": "12",

"usedAmfDrx": {

"drxValue": "0",

"present": "0"

},
```

```
"usedServiceAreaRestrict": {

"maxNumberOfTAs": "0",

"restrictAreaCount": "0",

"restrictionType": "INVALID"

},

"usedServiceAreaRestrictChgFlag": "false",

"usedServiceAreaRestrictSrc": "invalid"

},

"AMFPDU": {

"allocatedEbiCount": "0",

"allocatedPduSessCount": "0",

"dnnInUse": "NONE",

"dnnInUseFpx": "0",

"isEmerPduSessFlag": "false",

"notifyId": "0",

"pduSessPoolIdx": "0",

"pduSessionId": "0",

"psiListIdx": "0"

},

"AMFAUTHENTICATIONDATA": {

"authType": "5G aka",

"curAuthIdx": "1",
```

```
"eapKseaf":
"0x00000000000000000000000000000000000000000000000000000000
00000000", "plmn": "310210", "reuseCurAuthIdxFlag": "false", "vectorCount": "2", "vectors": [

{

"AUTN": "0xABCD",

"HXRES": "0xABCD",

"Kseaf": "0xABCD",

"RAND": "0xABCD"

},

{

"AUTN": "0xABCD",

"HXRES": "0xABCD",

"Kseaf": "0xABCD",

"RAND": "0xABCD"

}

]

},

"AMFSECURITYDATA": {

"dlNasCount3gpp": "5",

"gnbSecurityContext": {
```

```
"ncc": "0",

"nhKey": "0xABCD"

},

"kamf": "0xABCD",

"kamfPrime": "0x000000000000000000000000000000000000000000000000000000000000000000000000", "keNBNasCount": "0", "kenc": "0xABCD", "kint": "0xABCD", "nasKsi_KsiValue": "3", "nasKsi_tsc": "CACHED", "selectedAsAlgorithm": "0", "selectedCipheringNasAlgorithm": "0", "selectedIntegrityNasAlgorithm": "0", "ueSecurityCapability": "0x80C0", "ulNasCount3gpp": "3"
      }
     }
    }
}
```

Of course, those skilled in the art will recognize that this is merely an example of possible converted API format, and that many other query response formats may be used within the scope of the disclosure. In some embodiments, once the customer registration information retrieved from the query has been converted to API format, the registration information may be requested and received at substantially any time to identify if there may be current registration. In some embodiments, the process described above may be automated so that the client system may receive an input of a particular customer identifier and/or login credentials, query the AMF via the AMF REST interface based on the customer identifier, and return customer registration information for the particular customer.

Figure 5:
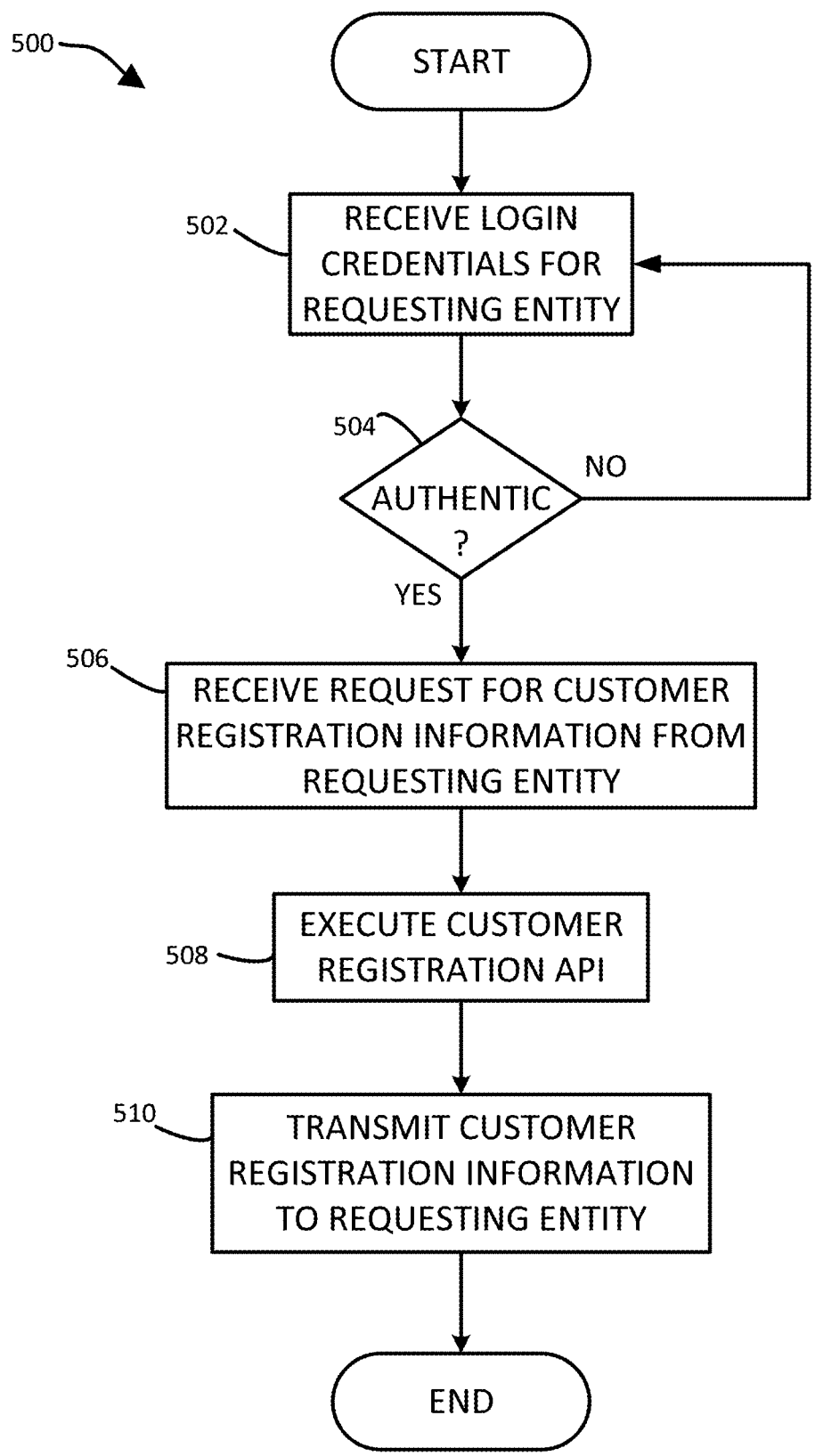
FIG. 5 is a flowchart of another embodiment of a method of improved access to customer registration information in accordance with the disclosure.

In some embodiments, the process of requesting and receiving customer registration information may be performed via the customer registration API. In some embodiments, the customer registration API may provide for a one-shot call of customer registration information without subscribing to updates. In other words, a requesting entity may use the customer registration API to retrieve customer registration information for a particular customer. FIG. 5 is a flow chart 500 illustrating an embodiment of a method of using the customer registration API to access customer registration information. In some embodiments, at 502, the client system or another computing entity hosting the customer registration API may receive login credentials for a requesting entity, such as from a requesting entity computing device 302 or requesting entity server 306. At 504, if the login credentials cannot be authenticated, the process may stop or the customer service API may request the credentials again. If the login credentials may be authenticated, the customer service API may request a customer identifier for a customer for which the requesting entity seeks registration information.

At 506, the customer registration API may receive a customer identifier for a particular customer, such as an IMSI, MSISDN, or other identifying information. At 508, the method may include executing the customer registration API to return the particular customer's registration information. In some embodiments, the customer registration API may query an AMF to retrieve the requested data. In some embodiments, the customer registration API may be a REST API. In some embodiments, the customer registration API may use the AMF REST interface to query information stored on the AMF relating to registered customers. The customer registration API may include a HTTP GET request and/or an HTTP POST request, or other mechanisms to query and return customer registration information. In some embodiments, the customer registration API may perform some or all of the steps shown and described in relation to FIG. 4 In some embodiments, the customer registration API may include code and response information similar to the commands and responses shown above with regard to Example 1, but other types of commands and responses may be used consistent with the teachings of the disclosure. Those of skill in the art will understand that the customer registration API may also operate in other ways consistent with the disclosure.

At 510, the customer registration API (e.g., via the client system) may transmit the retrieved customer registration information to the requesting entity. The customer registration information may include any of a variety of information. For example, the customer registration information may include a general profile of the particular customer's connection to the network, such as where the particular customer may be identified in a cellular or data network, how the customer may be registered, the internet protocol (IP) address of devices associated with a customer, which systems in a network the customer's device may be connected to (e.g., which AMF connected to which gNB, etc.), speed of the customer device's connection to the network, etc. In some embodiments, the customer registration information may also include a data network name (DNN), such as an access point name (APN).

The customer registration API and systems and methods described herein may provide technical solutions to the technical problem of quickly and efficiently accessing customer registration information. For example, if a customer service agent needs to perform troubleshooting activities, the agent traditionally may encounter problems identifying customer registration information quickly and efficiently, such as while the customer is waiting on the phone, because accessing the desired information may include taking several burdensome steps. Such agents and other entities may benefit from the systems and methods described herein by providing a technical solution to quickly and easily accessing customer registration information for a particular customer. In some instances, the particular customer may be waiting on the phone with a problem, or be otherwise expecting a problem to be addressed quickly. In such instances, a customer service agent may use the customer registration API described herein to quickly access the customer information, identify the source of a customer's problems, and potentially solve those problems or determine additional actions that may help solve those problems. Accordingly, the system and methods described herein have a practical application of providing for improved customer support solutions through technical solutions related to improved computer resource and time efficiency.

Figure 6:
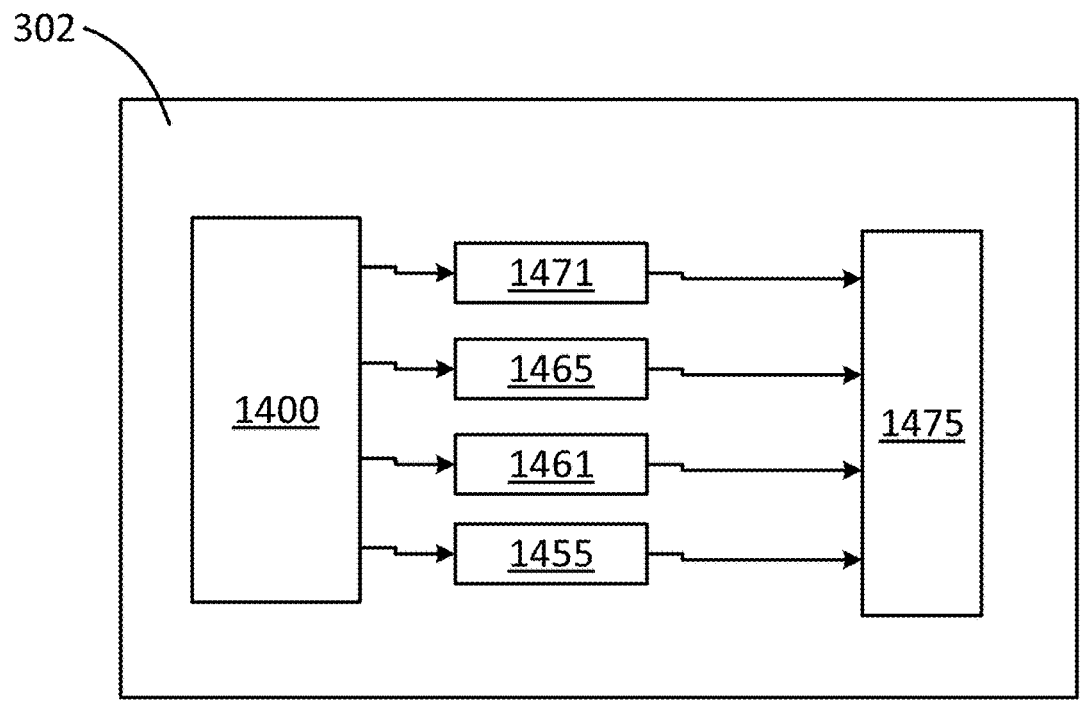
FIG. 6 is a schematic illustration of elements of an embodiment of an example computing device.
Figure 7:
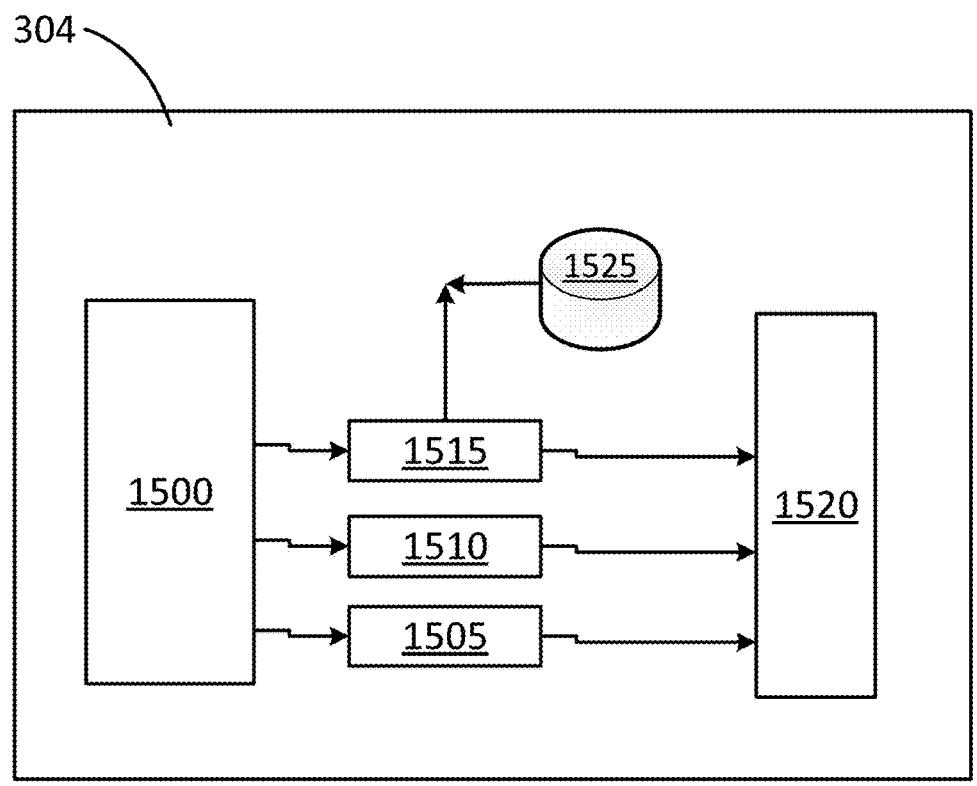
FIG. 7 is a schematic illustration of elements of an embodiment of a server type computing device.

FIG. 6 is a simplified illustration of the physical elements that make up an embodiment of a computing device, such as the requesting entity computing device 302, and FIG. 7 is a simplified illustration of the physical elements that make up an embodiment of a server type computing device, such as the client system server 304. Referring to FIG. 6, a sample computing device is illustrated that is physically configured to be part of the systems and method for improved access to customer registration information. The computing device 302 may have a processor 1451 that is physically configured according to computer executable instructions. In some embodiments, the processor may be specially designed or configured to optimize communication between a server such as client system server 304 and the computing device 302 relating to the system described herein. The computing device 302 may have a portable power supply 1455 such as a battery, which may be rechargeable. It may also have a sound and video module 1461 which assists in displaying video and sound and may turn off when not in use to conserve power and battery life. The computing device 302 may also have volatile memory 1465 and non-volatile memory 1471. The computing device 302 may have GPS capabilities that may be a separate circuit or may be part of the processor 1451. There also may be an input/output bus 1475 that shuttles data to and from the various user input/output devices such as a microphone, a camera, a display, or other input/output devices. The computing device 302 also may control communicating with networks either through wireless or wired devices. Of course, this is just one embodiment of a computing device 302 and the number and types of computing devices 302 is limited only by the imagination.

The physical elements that make up an embodiment of a server, such as the client system server 304, are further illustrated in FIG. 7. In some embodiments, the client system server may be specially configured to run the system and methods for improved customer registration information or the customer registration API as described herein. At a high level, the client system server 304 may include a digital storage such as a magnetic disk, an optical disk, flash storage, non-volatile storage, etc. Structured data may be stored in the digital storage a database. More specifically, the server 304 may have a processor 1500 that is physically configured according to computer executable instructions. In some embodiments, the processor 1500 can be specially designed or configured to optimize communication between a computing device, such as computing device 302, and the server 304 relating to the system as described herein. The server 304 may also have a sound and video module 1505 which assists in displaying video and sound and may turn off when not in use to conserve power and battery life. The server 304 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with networks either through wireless or wired devices. In some embodiments, a customer registration controller for running a customer registration API may be located on the computing device 302. However, in other embodiments, the customer registration controller may be located on client system server 304, or both the computing device 302 and the server 304. Of course, this is just one embodiment of the client system server 304 and additional types of servers are contemplated herein.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for providing customer registration information for a customer in a cellular network, the method comprising:
   receiving a request for customer registration information from a computing device of a requesting entity, the request for customer registration information including a customer identifier of the customer, wherein the customer is a different entity than the requesting entity;
   providing login credentials of the requesting entity to a control node;
   in response to the login credentials being authenticated, logging out of the control node and providing the login credentials of the requesting entity a second time;
   querying the control node for customer registration information of the customer based on the customer identifier;
   receiving the customer registration information in response to the query;
   parsing the received customer registration information;
   converting the received customer registration information to an application programming interface (API) response; and
   transmitting the converted customer registration information to the computing device of the requesting entity.

2. The method of claim 1, wherein providing login credentials associated with the requesting entity to the control node includes interfacing with the control node via a representational state transfer (REST) interface.

3. The method of claim 1 wherein the control node is an access and mobility management function (AMF).

4. The method of claim 1, wherein the customer identifier is international mobile subscriber information (IMSI) of the customer.

5. The method of claim 1, wherein at least querying the control node, receiving customer registration information, parsing the received customer registration information, and converting the received customer registration information are performed by a customer registration application programming interface (API).

6. The method of claim 1 further comprising authenticating the login credentials with a network repository function (NRF).

7. The method of claim 1, wherein the control node is a mobility management entity (MME).

8. The method of claim 1, wherein the API response is a REST API response.

9. The method of claim 1, wherein the request for customer registration information is a REST API request.

10. The method of claim 1, wherein the request for customer registration information is an HTTP POST request.

11. The method of claim 10, wherein the HTTP POST request includes a zero duration notification.

12. The method of claim 1, wherein the request for customer registration information is an HTTP GET request.

13. A system for providing access to customer registration information for a customer in a cellular network, the system comprising:
   a computing device associated with a requesting entity distinct from the customer;
   a control node of the cellular network; and
   a client system including an application programming interface (API) configured to:
      receive a request for customer registration information from the computing device of the requesting entity, the request for customer registration information including a customer identifier of the customer;
      provide login credentials of the requesting entity to the control node;
      log out of the control node and provide the login credentials of the requesting entity a second time without additional input from the computing device;
      query the control node for customer registration information of the customer based on the customer identifier;
      receive the customer registration information in response to the query;
      parse the received customer registration information;

convert the received customer registration information to a REST API response; and transmit the REST API response to the computing device of the requesting entity.

14. The system of claim 13 further comprising a network repository function (NRF), and wherein the API is further configured to authenticate login credentials associated with the requesting entity with the NRF.

15. The system of claim 13, wherein the control node is an access and mobility management function (AMF).

16. The system of claim 13, wherein the request for customer registration information is a REST API request.

17. The system of claim 13, wherein the request for customer registration information is an HTTP POST request.

18. The system of claim 13, wherein the request for customer registration information is an HTTP GET request.

19. A computer-implemented method for providing customer registration information for a customer in a cellular network, the method comprising:

receiving a request from a computing device of a requesting entity, the request including a customer identifier of the customer, wherein the customer is a different entity than the requesting entity;

providing login credentials of the requesting entity to a control node;

querying the control node for customer registration information of the customer based on the customer identifier, wherein the query is an HTTP POST request including a zero duration notification;

receiving the customer registration information in response to the query;

parsing the received customer registration information;

converting the received customer registration information to an application programming interface (API) response; and transmitting the API response to the computing device of the requesting entity.

* * * * *